(12) United States Patent
Liu et al.

(10) Patent No.: US 10,081,049 B2
(45) Date of Patent: Sep. 25, 2018

(54) DETACHABLE DOUBLE-LOCKING RIVETING DISMOUNTING METHOD AND PULLING RIVET

(71) Applicant: MEISHAN CRRC FASTENING SYSTEM CO., LTD., Meishan, Sichuan (CN)

(72) Inventors: Yu Liu, Sichuan (CN); Kai Fu, Sichuan (CN); Shuping Pan, Sichuan (CN); Fangnian Hu, Sichuan (CN); Yang Liu, Sichuan (CN); Yunlong Jia, Sichuan (CN); Guanglian Xiong, Sichuan (CN); Xiangyun Zhao, Sichuan (CN); Guangcheng Dai, Sichuan (CN); Xu He, Sichuan (CN)

(73) Assignee: MEISHAN CRRC FASTENING SYSTEM CO., LTD., Meishan, Sichuan (CN)

( * ) Notice: Subject to any disclaimer, the term of this patent is extended or adjusted under 35 U.S.C. 154(b) by 331 days.

(21) Appl. No.: 14/905,224

(22) PCT Filed: Mar. 9, 2015

(86) PCT No.: PCT/CN2015/073848
§ 371 (c)(1),
(2) Date: Jan. 14, 2016

(87) PCT Pub. No.: WO2016/074384
PCT Pub. Date: May 19, 2016

(65) Prior Publication Data
US 2016/0325340 A1    Nov. 10, 2016

(30) Foreign Application Priority Data

Nov. 14, 2014    (CN) .......................... 2014 1 0650279

(51) Int. Cl.
*B21J 15/02* (2006.01)
*B21J 15/04* (2006.01)
(Continued)

(52) U.S. Cl.
CPC ............... *B21J 15/02* (2013.01); *B21J 15/04* (2013.01); *B21J 15/043* (2013.01); *B21J 15/50* (2013.01); *F16B 19/1054* (2013.01)

(58) Field of Classification Search
CPC .............. B21J 15/022; Y10T 29/49943; Y10T 29/49956
See application file for complete search history.

(56) References Cited

U.S. PATENT DOCUMENTS 1,784,755 A * 12/1930 Rosenberg .............. F16B 29/00
29/512
2,282,711 A *  5/1942 Eklund ............... F16B 19/1063
29/432

(Continued)

FOREIGN PATENT DOCUMENTS

CN    1114102 A    12/1995
CN    1302961 A    7/2001
(Continued)

*Primary Examiner* — Jason L Vaughan
(74) *Attorney, Agent, or Firm* — Novick, Kim & Lee, PLLC; Allen Xue

(57) ABSTRACT

The invention discloses a detachable double-locking riveting dismounting method and a pulling rivet. A lantern ring comprises a thin-wall hook section, a thick-wall locking section and a lantern ring head with an annular step from front to back. The rivet comprises a rivet head of an annular groove matched with the hook section, a front polish rod section, a knurling section matched with the locking section, a separating groove, a rear polish rod and a tail annular groove section from front to back. Double riveting is used by inserting the rivet and lantern ring from both sides; after riveting, the locking section and knurling section form radial (Continued)

locking, and the hook section is buckled to form axial locking. Simple detaching tools (e.g. front snap ring and center cylinder) are equipped to dismount rivets rapidly.

2 Claims, 7 Drawing Sheets

(51) Int. Cl.
*B21J 15/50* (2006.01)
*F16B 19/10* (2006.01)

(56) References Cited

U.S. PATENT DOCUMENTS

| | | | | |
|---|---|---|---|---|
| 2,384,321 A | * | 9/1945 | Lees, Jr. | F16B 19/1054 29/512 |
| 2,887,003 A | * | 5/1959 | Brilmyer | B21J 15/045 29/509 |
| 3,038,626 A | * | 6/1962 | Simmons | B21J 15/045 29/243.522 |
| 3,078,002 A | * | 2/1963 | Rodgers, Jr. | F16B 5/01 29/509 |
| 3,276,308 A | * | 10/1966 | Bergere | F16B 19/1054 29/509 |
| 3,295,404 A | | 1/1967 | Baker | |
| 3,369,289 A | * | 2/1968 | Gapp | B21J 15/043 29/512 |
| 3,425,259 A | * | 2/1969 | Baugh | B21J 15/022 29/243.522 |
| 4,233,878 A | * | 11/1980 | McGauran | B21H 3/06 411/510 |
| 4,904,133 A | * | 2/1990 | Wright | B21J 15/045 29/512 |
| 5,286,151 A | * | 2/1994 | Eshraghi | B21J 15/365 29/524.1 |
| 6,704,986 B1 | | 3/2004 | Liu | |
| 8,529,177 B2 | * | 9/2013 | Toosky | F16B 19/1054 411/34 |

FOREIGN PATENT DOCUMENTS

| | | |
|---|---|---|
| CN | 1369041 A | 9/2002 |
| CN | 1653277 A | 8/2005 |
| CN | 102108999 A | 6/2011 |
| CN | 103240381 A | 8/2013 |
| CN | 103551486 A | 2/2014 |
| WO | 2014178036 A1 | 11/2014 |

* cited by examiner

DETACHABLE DOUBLE-LOCKING RIVETING DISMOUNTING METHOD AND PULLING RIVET

FIELD OF THE INVENTION

Detachable double-locking riveting dismounting method and pulling rivet of the invention relate to a structure of a detachable pulling rivet and a technology for riveting and dismounting rivet, belonging to the riveting class (B21J) and fastener class (F16B) in the industry of metal mechanical processing.

DESCRIPTION OF THE RELATED ART

The wall slab of railway box car is composed of external metal plates and internal composite plates. As the composite plates decorated are frequently dismounted, screw is still the main method for connecting the metal plates to be dismounted and non-metal plates. Although screw connection is detachable, but connection strength is low, screw is easy to loosen and fall off under collision of goods.

If general rivets are used to connect metal plates to be dismounted and non-metal plates, composite plates are easier to be crushed under a strong riveting force. Even though the metal plates can be riveted, it is very difficult to dismount them.

SUMMARY OF THE INVENTION

The detachable double-locking riveting dismounting method and pulling rivet of the invention aims at solving the existing difficult problem about connection between metal plates to be dismounted and non-metal plates. The technical solution is as follows:

Detachable double-locking riveting dismounting method, characterized by comprising the following steps:

(1) manufacturing the following pulling rivet: wherein the pulling rivet comprises a rivet and a lantern ring including a bending hook section with thin-wall cylinder, a locking section with thick-wall cylinder and a lantern ring head that are connected orderly from front to back; an annular step for dismounting is arranged at the edge of the front end surface of the lantern ring head that is of round head or flat head; the thin-wall cylinder of the bending hook section and the thick-wall cylinder of the locking section are identical in outer diameter, intermediate diameter or inner diameter; the rivet comprises a rivet head, a front polish rod section, a knurling section in extrusion match with the locking section, a separating groove, a rear polish rod and a tail annular groove section that are connected orderly from front to back; annular grooves matched with the shape of the deformed bending hook section of the lantern ring are opened at the front and rear side surfaces of the rivet head; the knurling section is longer than the bending hook section, and the deformation strength of the bending hook section is less than the locking strength of the knurling section.

(2) The method for riveting connected plates with the pulling rivet comprises the following steps:
① inserting the rivet into the mounting holes of two connected plates from front to back and passing it through the mounting holes, and sleeving the lantern ring outside the rivet from the rear end of the rivet; ② clipping the tail annular groove section by using a clip of a riveting machine, pulling the rivet backward after starting the riveting machine, and pushing the lantern ring forward by using a jacket of the riveting machine; ③ continuing pulling and pushing the riveting machine to achieve interference fit between the locking section of the lantern ring and the knurling section of the rivet so as to from radial locking, and deforming the bending hook section of the lantern ring into a hook shape to buckle the lower connected plate, thus forming axial locking; ④ continuing pulling the rivet backward, separating the rivet at the separating groove, keeping the riveting machine away, and complete riveting.

(3) The method for dismounting the pulling rivet after riveting by using the riveting method comprises the following steps:
1) manufacturing the following dismounting tool: ① arranging a front snap ring with front end in match with the annular step of the lantern ring in dimension, locking the rear end of the front snap ring in a pull ring arranged, and arranging a hydraulic part that is in transmission connection with the pull ring in manual hydraulic tool; ② arranging a center cylinder passing through the center hole of the manual hydraulic tool, and arranging a fixed part directly facing the rear end of the center cylinder in the manual hydraulic tool; ③ setting a fixed convex block at the front side of the rivet head;
2) making the front end of the center cylinder against the separating groove with snapped rivet, and bucking the annular step with the front end of the front snap ring;
3) Starting the manual hydraulic tool, and making the fixed part against the center cylinder; pulling the snap ring backward by using the hydraulic part, and applying a backward pulling force to the annular step through the front snap ring so as to move the lantern ring backward, thus straightening the lantern ring firstly, and then pulling the interference fit surface of the knurling section open so as to complete detaching.

The pulling rivet provided for completing the method for detaching rivet comprises a rivet and a lantern ring. A separating groove, a rear polish rod and a tail annular groove section in clamp connection with the riveting machine are arranged at the rear end of the rivet, characterized in that:

1) the lantern ring comprises a bending hook section with thin-wall cylinder, a locking section with thick-wall cylinder and a lantern ring head that are connected orderly from front to back; an annular step for dismounting is arranged at the edge of the front end surface of the lantern ring head that is of round head or flat head; the thin-wall cylinder of the bending hook section and the thick-wall cylinder of the locking section are identical in outer diameter, intermediate diameter or inner diameter;

2) the front section of the rivet comprises a rivet head, a front polish rod section, and a knurling section in extrusion match with the locking section; annular grooves matched with the deformed bending hook section of the lantern ring in shape are opened at the front and rear side surfaces of the rivet head;

3) the knurling section is longer than the bending hook section, and the deformation strength of the bending hook section is less than the locking strength of the knurling section.

The advantages of the invention are as follows:
1) Safe and reliable riveting: As lantern ring is of the structure of thin-wall bending hook section and thick-wall locking section, double-locking (radial and axial) riveting can be achieved and lantern ring is not easy to loosen and fall off.
2) Simple production process and low cost: The pulling rivet can achieve batch cold upsetting production.
3) Convenient installation and simple operation: Special riveting tool can be installed within 10 seconds, and workers can install it after short-time training.
4) No waste gas and other pollution during installation.
5) Convenient dismounting and good late maintenance: As detachable step is designed, the knurling section designed is longer than the bending hook section, the deformation strength of the bending hook section is less than the locking strength of the knurling section, and fixed convex block is designed, reliable dismounting is ensured. With manual hydraulic tool, dismounting can be completed within 10 seconds, thus achieving convenient dismounting and good late maintenance.
6) Wide scope of application and achievement of connection of multiple materials: the method can be used for steel plates, aluminum plates or other metal plates used in automobile, rail vehicle, building, municipal construction, and used for riveting carbon fiber, glass plate and composite plates.

DESCRIPTION OF THE PREFERRED EMBODIMENT

Figure 1:
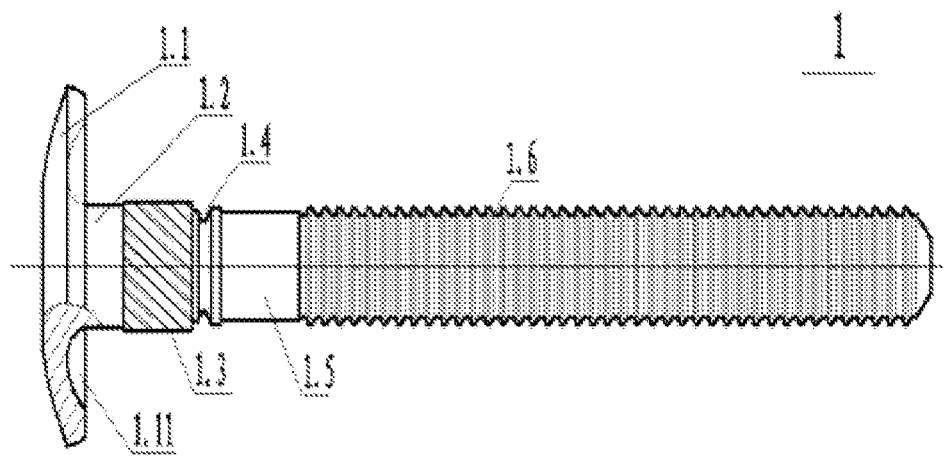
FIG. 1 is a single-piece graph of rivet 1.
Figures 2, 3:
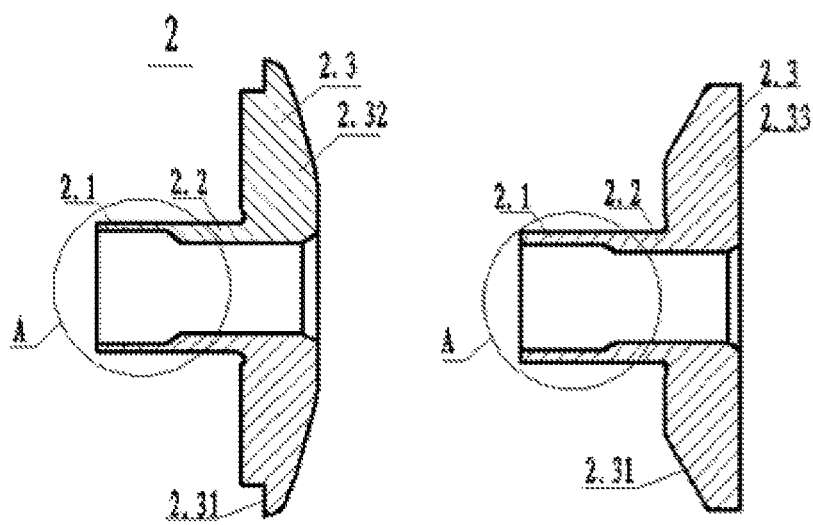
FIG. 2 is a schematic diagram of lantern ring (2) (lantern ring head is round head 2.32).
FIG. 3 is a schematic diagram of lantern ring (3) (lantern ring head is flat head 2.33).
Figure 4:
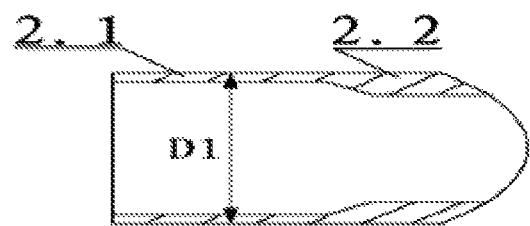
FIG. 4 is a partial enlarged drawing A of FIG. 2 or FIG. 3: the bending hook section is identical with locking section in outer diameter.
Figure 5:
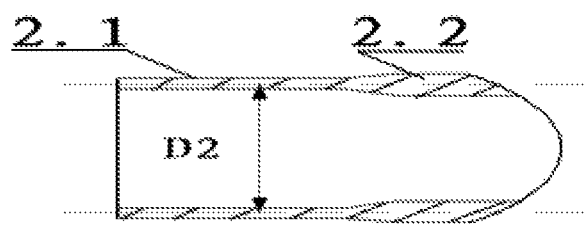
FIG. 5 is a partial enlarged drawing A of FIG. 2 or FIG. 3: the bending hook section is identical with locking section in intermediate diameter.
Figure 6:
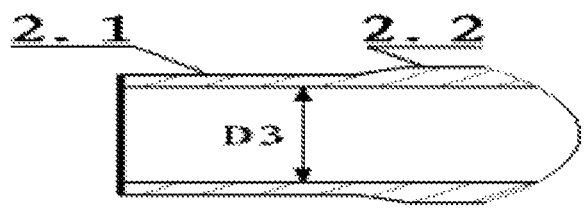
FIG. 6 is a partial enlarged drawing A of FIG. 2 or FIG. 3: the bending hook section is identical with locking section in inner diameter.
Figure 7:
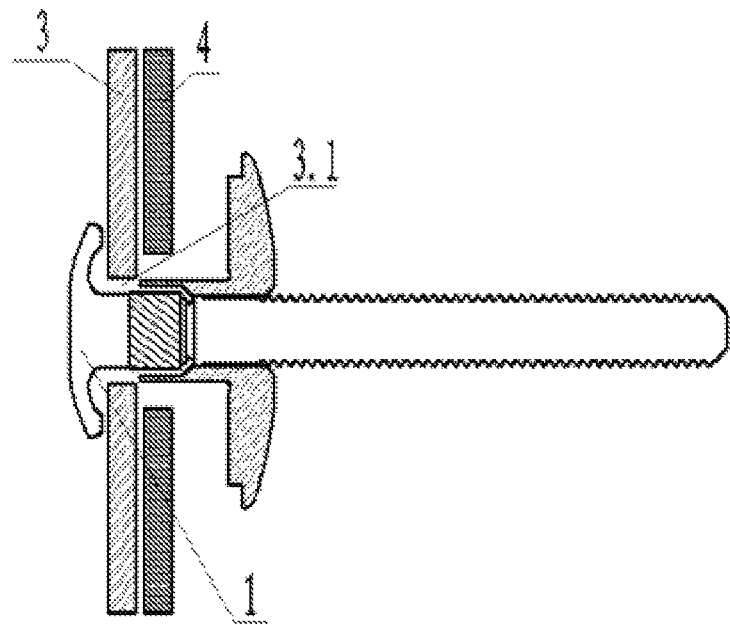
FIG. 7 is a schematic diagram of the first riveting step.
Figure 8:
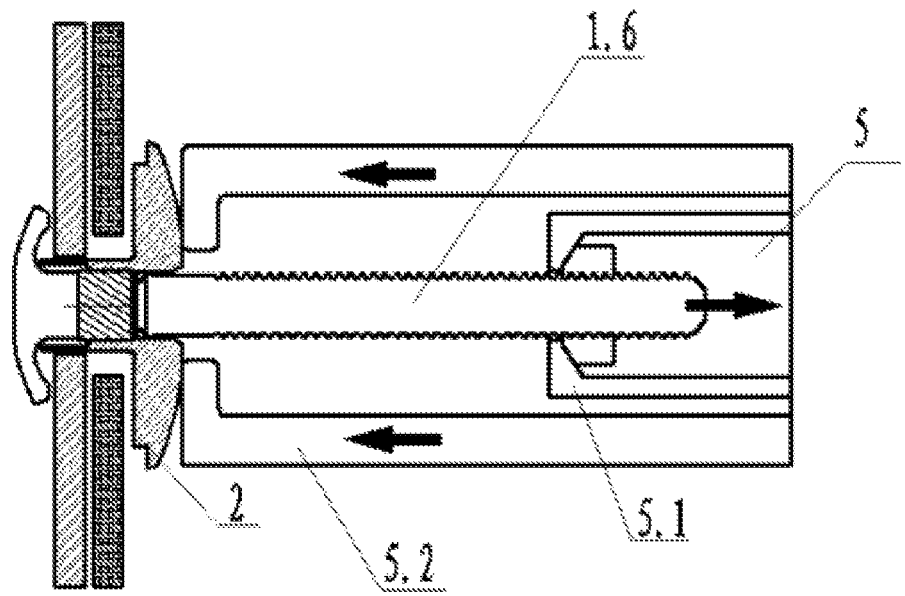
FIG. 8 is a schematic diagram of the second riveting step.
Figure 9:
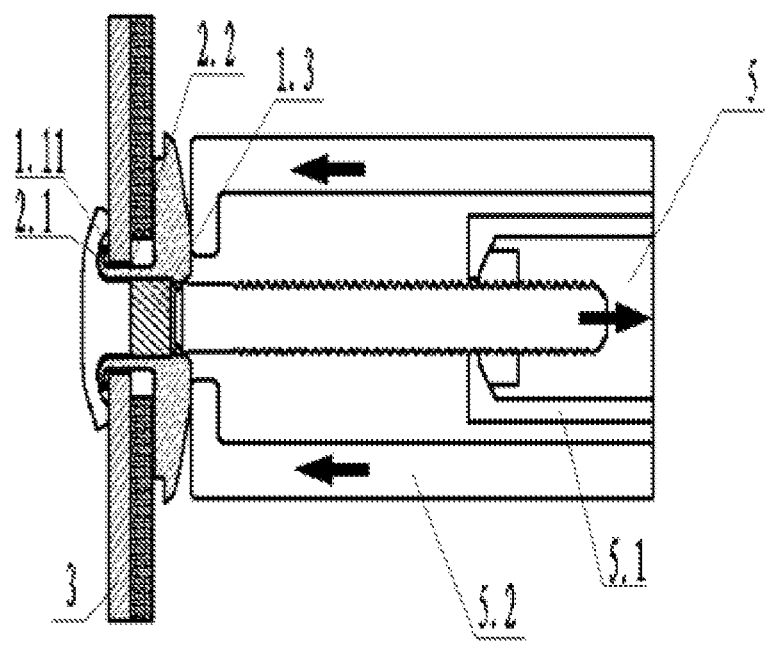
FIG. 9 is a schematic diagram of the third riveting step.
Figure 10:
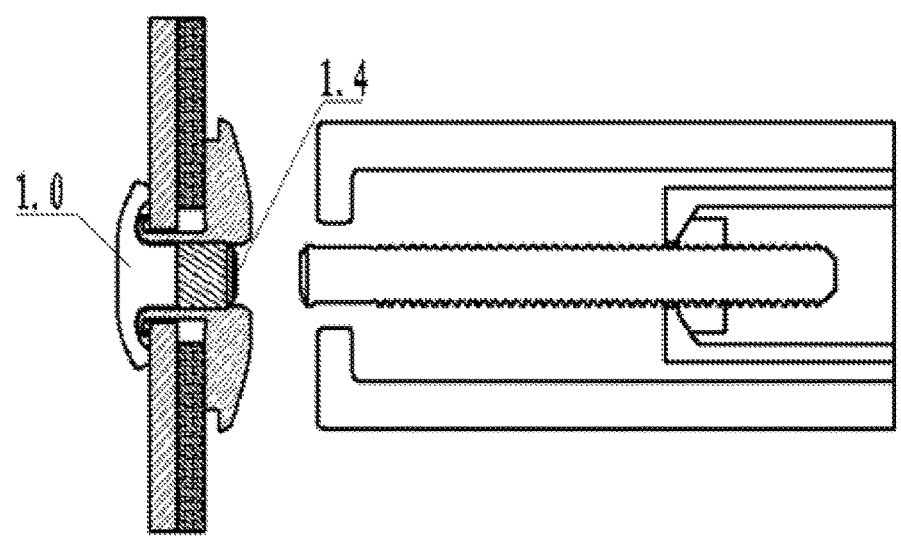
FIG. 10 is a schematic diagram of the fourth riveting step.

The detachable double-locking riveting dismounting method in the embodiment comprises the following steps:
(1) manufacturing the following pulling rivet:
wherein the pulling rivet comprises a rivet 1 and a lantern ring 2 (see FIG. 2 and FIG. 3) including a bending hook section 2.1 with thin-wall cylinder, a locking section 2.2 with thick-wall cylinder and a lantern ring head 2.3 that are connected orderly from front to back. An annular step 2.31 for dismounting is arranged at the edge of the front end surface of the lantern ring head that is of round head 2.32 (see FIG. 2) or flat head 2.33 (see FIG. 3). As shown in FIG. 1, the rivet 1 comprises a rivet head 1.1, a front polish rod section 1.2, a knurling section 1.3 in extrusion match with the locking section, a separating groove 1.4, a rear polish rod 1.5 and a tail annular groove section 1.6 that are connected orderly from front to back. Annular grooves 1.11 matched with the deformed bending hook section of the lantern ring in shape are opened at the front and rear side surfaces of the rivet head. As shown in FIG. 4, the thin-wall cylinder of the bending hook section 2.1 and the thick-wall cylinder of the locking section 2.2 can be of identical outer diameter D1. As shown in FIG. 5, the thin-wall cylinder of the bending hook section and the thick-wall cylinder of the locking section can be of identical intermediate diameter D2. As shown in FIG. 6, the thin-wall cylinder of the bending hook section and the thick-wall cylinder of the locking section can be of identical inner diameter D3. As shown in FIG. 1 to FIG. 3, the knurling section 1.3 is longer than the bending hook section 2.1, and the deformation strength of the bending hook section is less than the locking strength of the knurling section. The method for riveting connected plates with the pulling rivet in the embodiment comprises the following steps:
1) As shown in FIG. 7, inserting the rivet into the mounting holes 3.1 of two connected plates (3, 4) from front to back and passing it through the mounting holes 3.1, and sleeving the lantern ring outside the rivet from the rear end of the rivet.
2) As shown in FIG. 8, clipping the tail annular groove section by using a clip 5.1 of a riveting machine 5, pulling the rivet 1 backward after starting the riveting machine, and pushing the lantern ring 2 forward by using the jacket 5.2 of the riveting machine;
3) As shown in FIG. 9, continuing pulling and pushing the riveting machine to achieve interference fit between the locking section 2.2 of the lantern ring and the knurling section 1.3 of the rivet so as to from radial locking, and deforming the bending hook section of the lantern ring 2.1 into a hook shape to buckle the lower connected plate 3, thus forming axial locking;
4) As shown in FIG. 10, continuing pulling the rivet backward, separating the rivet at the separating groove 1.4, keeping the riveting machine away, and completing riveting; The riveted rivet disconnected is marked to be 1.0.

Figure 11:
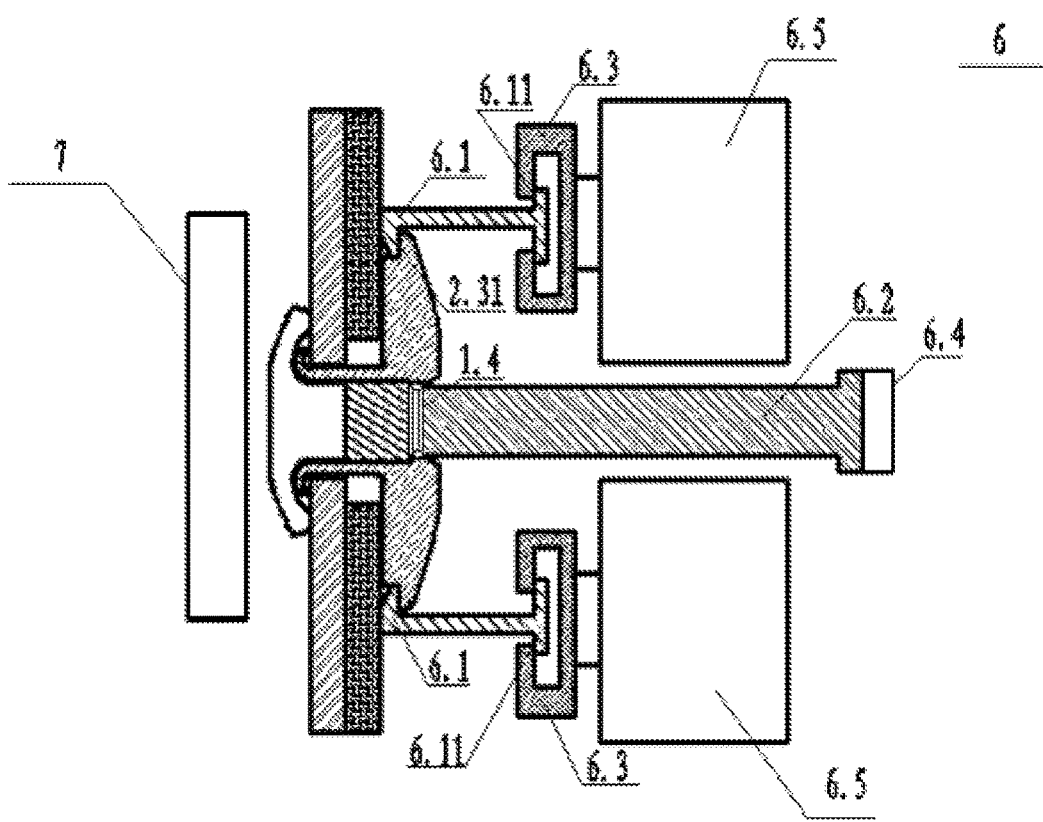
FIG. 11 is structural diagram of dismounting tool 6 and schematic diagram of the first dismounting step.
Figure 12:
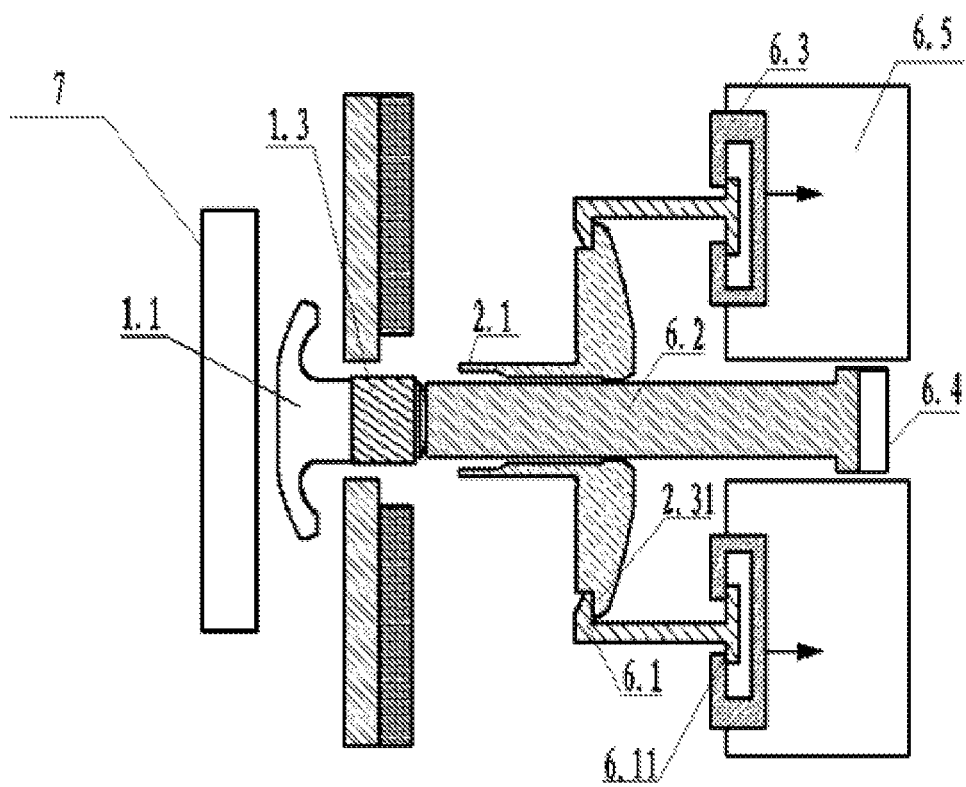
FIG. 12 is a schematic diagram of the second dismounting step.

The method for dismounting pulling rivet riveted by using the detachable double-locking riveting method in the embodiment comprises the following steps:
1) manufacturing the following dismounting tool 6: ① as shown in FIG. 11. arranging a front snap ring 6.1 with front end in match with the annular step 2 of the lantern ring in dimension, locking the rear end 6.11 of the front snap ring in a pull ring 6.3 arranged, and arranging a hydraulic part 6.3 that is in transmission connection with the pull ring in manual hydraulic tool. ② Arranging a center cylinder 6.2 passing through the center hole of the manual hydraulic tool, and arranging a fixed part 6.4 directly facing the rear end of the center cylinder in the manual hydraulic tool. ③ As shown in FIG. 11 and FIG. 12, setting a fixed convex block 7 at the front side of the rivet head 1.1.
2) As shown in FIG. 11, making the front end of the center cylinder 6.2 against the snapped surface 1.4 of rivet, and bucking the annular step 2.31 by using the front end of the front snap ring 6.1;
3) As shown in FIG. 12, starting the manual hydraulic tool, and making the fixed part 6 against the center cylinder 6.2; pulling the snap ring 6.3 backward by using the hydraulic part 6.5, and applying a backward pulling force to the annular step of the lantern ring through the front snap ring 6.1 so as to move the lantern ring 2 backward. As the knurling section 1.3 is longer than the bending hook section 2.1, and the deformation strength of the bending hook section is less than the locking strength of the knurling section, the bending hook section 2.1 of the lantern ring is strengthened firstly, and then the interference fit surface of the knurling section 1.3 is completely pulled open so as to complete dismounting.

As shown in FIG. 12, when the bending hook section 2.1 in individual product is not strengthened but its knurling section has become loose during dismounting, operator shall continue pulling the lantern ring backward by using the hydraulic part 6.5 of the manual hydraulic tool, and pull the center cylinder 6.2 and riveted rivet 1.1 (marked to be 1.0 in FIG. 10) by using the fixed part 6.4 in the manual hydraulic tool. At this time, operator can make rivet 1.1 moving forward against the fixed convex block 7 arranged, thus ensuring that the bending hook section is strengthened firstly, and then the interference fit surface of the knurling section is completely pulled open so as to complete dismounting.

As shown in FIG. 1 to FIG. 6, the rivet provided for completing the detachable double-locking riveting dismounting method in the embodiment is completely the same as the description in the step of "manufacturing the following pull rivet", and will not be repeated.

The invention claimed is:

1. A method for operating a detachable fastener, said detachable fastener comprises a rivet and a lantern ring, the lantern ring further comprises a tubular bendable hook section, a tubular locking section, and a lantern ring head that are connected successively, and a lantern ring through hole extending through the bendable hook section, the tubular locking section, and the lantern ring head, wherein the lantern ring head has a first surface facing away from the bendable hook section and the locking section, and a second surface connected to the locking section, and the first surface is flat or curvilinear, and the second surface has a step at a circumference of the second surface, wherein the rivet comprises a rivet head and a cylindrical rivet tail consisting of, successively, a first polished section, a knurling section, a separating groove, a second polished section, and a threaded rod, wherein the rivet head has a first surface facing away from the rivet tail and a second surface connected to the rivet tail, wherein the second surface is concave in shape, the method comprising:

juxtaposing a first plate and a second plate, wherein a through hole extends across the first plate and the second plate;

inserting a rivet into the through hole so that the rivet head and the rivet tail are on opposite sides of the through hole;

engaging the lantern ring with the rivet so that the bendable section of the lantern ring abuts the second surface of the rivet head and the wall of the bendable section expands and curls along the second surface of the rivet head, and the locking section of the lantern ring engages the knurling section in the rivet tail in an interference fit;

breaking the rivet at the separating groove so that the rivet head, the first polished section, and the knurling section are engaged with the lantern ring, thereby fastening the first plate and the second plate together;

applying a first pressure against the first surface of the rivet head;

applying a second pressure against the rivet knurling section, and the first pressure and the second pressure are opposite to each other;

pulling the lantern ring away from the rivet by applying a third pressure against the step at the circumference of the second surface of the lantern ring, whereby the expanded and curled bendable section in the lantern ring is straightened when pulled through the through hole extending through the first plate and the second plate; and separating the lantern ring from the rivet, wherein the third pressure is generated by a hydraulic device.

2. The method of claim 1, wherein, in the lantern ring, a thickness of a wall of the bendable hook section is smaller than the thickness of a wall of the locking section.

* * * * *